Aug. 18, 1959     L. A. RAMER     2,900,588
MULTIPLE SPEED SINGLE PHASE MOTORS
Filed Oct. 7, 1958     4 Sheets-Sheet 1

INVENTOR
LYLE A. RAMER

BY *Max L. Libman*

ATTORNEY

Aug. 18, 1959 L. A. RAMER 2,900,588
MULTIPLE SPEED SINGLE PHASE MOTORS
Filed Oct. 7, 1958 4 Sheets-Sheet 2

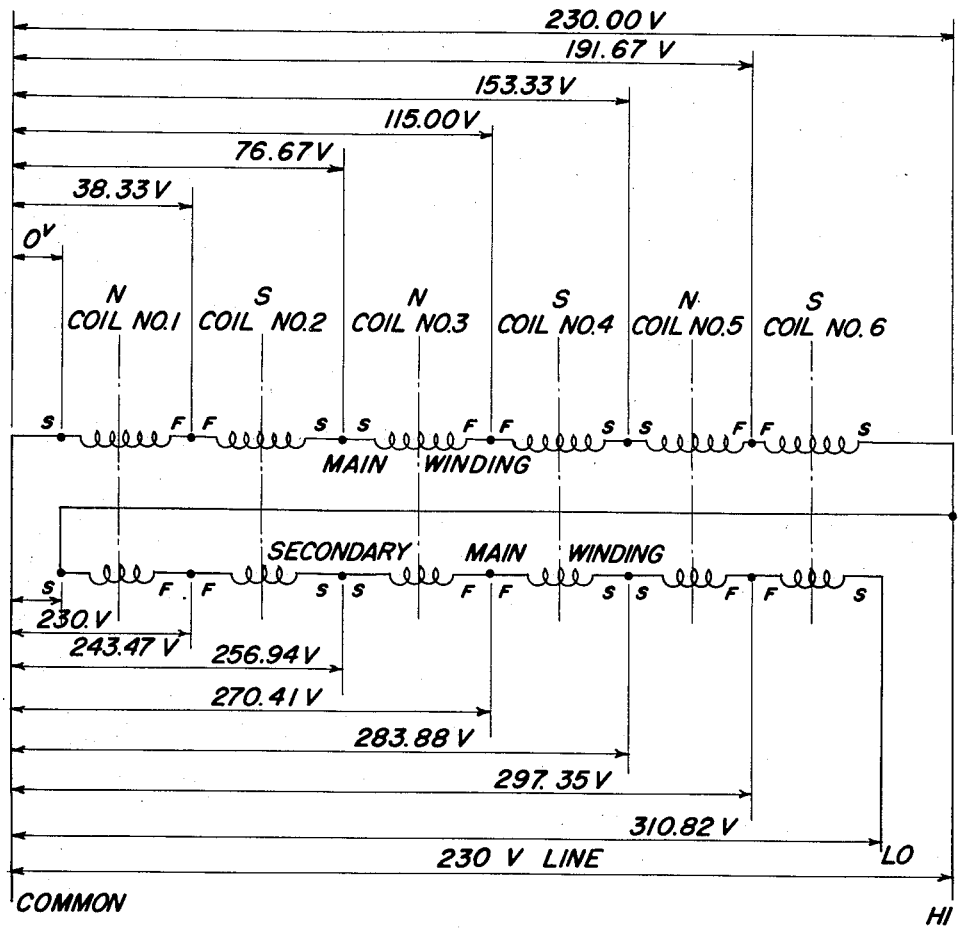

S = START LEAD (FIRST TURN OF COIL)
F = FINISH LEAD (LAST TURN OF COIL)

| COIL NO. | 1 | 2 | 3 | 4 | 5 | 6 |
|---|---|---|---|---|---|---|
| VOLTAGE-START LEAD SEC. MAIN | 230.00 | 256.94 | 256.94 | 283.88 | 283.88 | 310.82 |
| VOLTAGE-FINISH LEAD MAIN | 38.33 | 38.33 | 115.00 | 115.00 | 191.67 | 191.67 |
| VOLTAGE-BETWEEN WINDINGS | 191.67 | 218.61 | 141.94 | 168.88 | 92.21 | 119.15 |

VOLTAGE DISTRIBUTION OF CONVENTIONAL 6 POLE 2 SPEED TAPPED WINDING
ALL POLES WOUND SIMULTANEOUSLY AND INTERCONNECTED
AFTER WINDING

FIG. 3

INVENTOR
LYLE A. RAMER
BY Max L. Libman
ATTORNEY

Aug. 18, 1959   L. A. RAMER   2,900,588
MULTIPLE SPEED SINGLE PHASE MOTORS
Filed Oct. 7, 1958   4 Sheets-Sheet 3

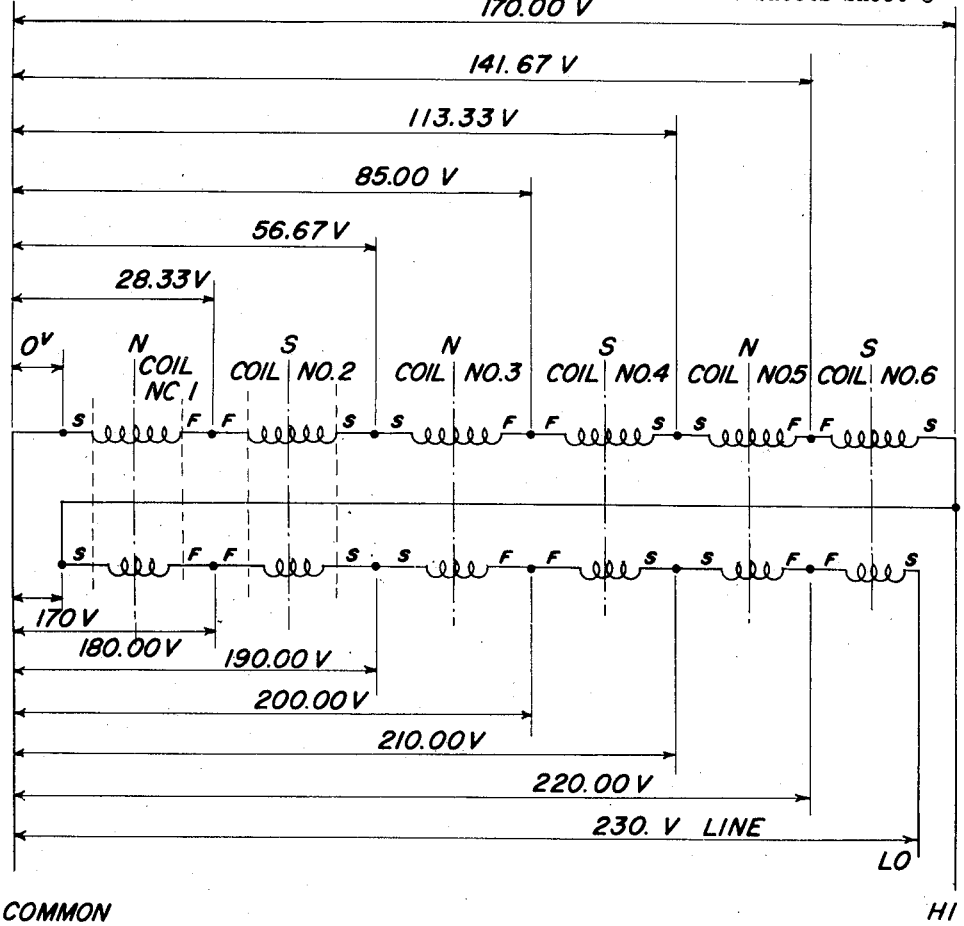

S = START LEAD (FIRST TURN OF COIL)
F = FINISH LEAD (LAST TURN OF COIL)

| COIL NO. | 1 | 2 | 3 | 4 | 5 | 6 |
|---|---|---|---|---|---|---|
| VOLTAGE-START LEAD SEC. MAIN | 170.00 | 190.00 | 190.00 | 210.00 | 210.00 | 230.00 |
| VOLTAGE-FINISH LEAD MAIN | 28.33 | 28.33 | 85.00 | 85.00 | 141.67 | 141.67 |
| VOLTAGE-BETWEEN WINDINGS | 141.67 | 161.67 | 105.00 | 125.00 | 68.33 | 88.33 |

VOLTAGE DISTRIBUTION OF CONVENTIONAL 6 POLE 2-SPEED TAPPED WINDING
ALL POLES WOUND SIMULTANEOUSLY AND COIL INTERCONNECTED AFTER
WINDING

FIG. 4

INVENTOR
LYLE A. RAMER

BY Max L. Libman
ATTORNEY

Aug. 18, 1959 — L. A. RAMER — 2,900,588
MULTIPLE SPEED SINGLE PHASE MOTORS
Filed Oct. 7, 1958 — 4 Sheets-Sheet 4

INVENTOR
LYLE A. RAMER
BY
ATTORNEY

United States Patent Office 2,900,588
Patented Aug. 18, 1959

2,900,588

MULTIPLE SPEED SINGLE PHASE MOTORS

Lyle A. Ramer, Elkton, Md., assignor to R M R Corporation, Elkton, Md., a corporation of Maryland Application October 7, 1958, Serial No. 765,841

5 Claims. (Cl. 318—225)

This invention relates to motors of the shaded pole type and permanent split capacitor type having four, six or more poles and wound for two or more speeds, and particularly to fractional horsepower motors of these types.

The primary object of the invention is to produce a motor of the above character with the field windings so arranged as to eliminate the use of two windings of different potential in the same slots and thereby remove a major cause of insulation breakdown and ultimate motor failure.

A further object of the invention is to produce a motor of the above character without the use of multiple windings.

Still another object is to produce a winding for motors of the above types which enables full utilization to be made of the maximum potential capacity of standard coil winding machinery, and with a great reduction in the number of intercoil connections, which greatly increases the economy of motor production while producing a superior result, due to the reduction in labor cost of making intercoil connections.

The specific nature of the invention, as well as other objects and advantages thereof, will clearly appear from a description of a preferred embodiment as shown in the accompanying drawings, in which:

Fig. 3 is a circuit diagram similar to that of Fig. 2, showing the voltage distribution in the coils when the motor is connected for high speed operation;

Fig. 4 is a diagram similar to Fig. 3 showing the voltage distribution when the motor is connected for low speed operation;

Figure 1:
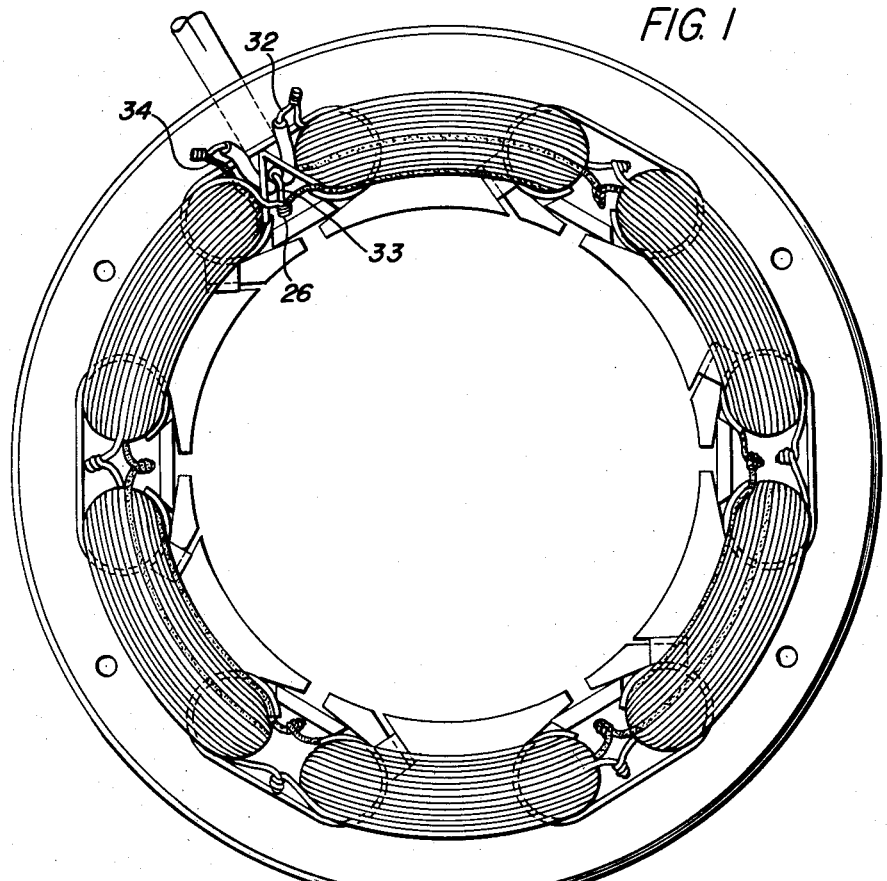
Fig. 1 is a schematic end view of the stator of a conventional A.-C. two-speed wound according to standard practice.
Figure 2:
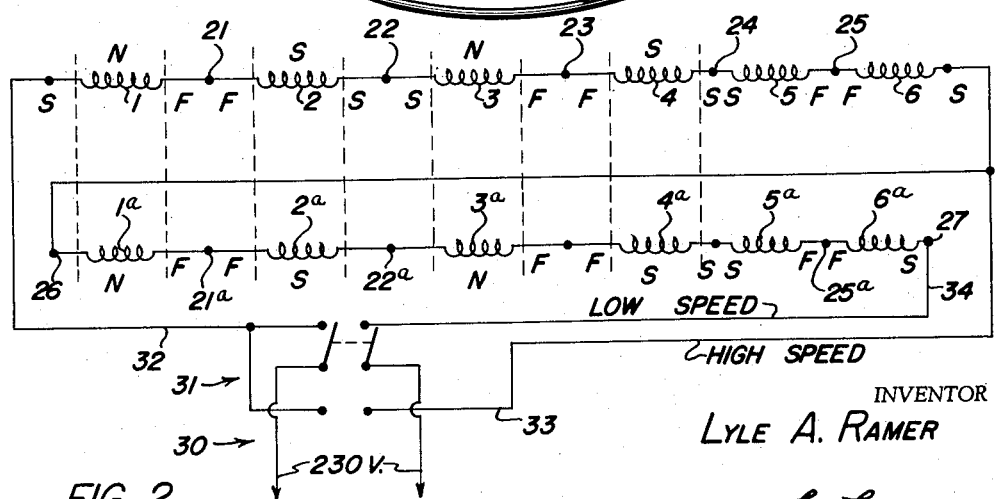
Fig. 2 is a schematic circuit diagram of a winding of the machine of Fig. 1, in developed form to show the relationship of the coils and pole pieces of the machine.

Fig. 1 shows the physical arrangement of the coils in a typical two speed shaded pole motor of conventional construction in order to demonstrate the nature of the problem. Each coil 1, 2, . . . 6 is wound on a separate pole 7, 8 . . . 12, respectively, by means of a standard coil winding machine of conventional design. In order to make full use of the production capabilities of the machine, the coils are wound simultaneously, which means that in the case of a six pole motor as shown, six coils will be simultaneously wound, each on a separate pole of the machine. In the case of a single speed motor, each coil is fully wound, and then all of the coils are connected in series, usually by twisting the leads of adjacent coils together and soldering or welding the tips of the twists together with a torch, after which a loose insulating sleeve, previously threaded on the wire, may be pushed up over the junction for insulation. Since the poles 7–12 are of alternate polarity, but all of the coils are wound in the same direction by the simultaneous winding operation, the opposite ends of successive coils are connected together in order to maintain correct polarity. Although the two windings are shown side by side on each pole, for clarity, in practice the second winding will at least partly overlie and cover the first winding, so that physically the two are in intimate contact at many points. If the motor is to be a two-speed motor, which is greatly preferred for fan and air-conditioner operation, then two coils are provided on each pole. These are connected as shown in Fig. 2. The standard practice in the simultaneous machine winding is to first wind the coil turns simultaneously on all six poles for the high-speed winding, thus producing coils 1–6 (Figs. 1 and 2). Then the machine is halted and a large loop pulled out to provide a tap on each coil; then the machine continues to wind, immediately adjacent each high-speed coil and on the same respective poles, a second coil of fewer turns which serve to provide the coils 1a–6a for low-speed operation. As will be evident from Fig. 2, there are now two coils on each pole. At this stage of the operation the two coils (e.g., 1, 1a) are connected in series by the large loop previously mentioned, but this loop is now cut to provide two independent coils wound on each pole. All of the high-speed or main coils 1–6 are now connected in series at points 21, 22, . . . 25 and are connected to the A.-C. source 30 through any suitable switch shown as a double pole double throw switch 31 and leads 32 and 33. In practice, with small fractional horsepower motors, a single pole double throw switch, generally of the rotary type, is most frequently used. The coils 1a–6a are similarly connected at one end to lead 33 and at the other end of the series of coils to switch 31 via lead 34. It will be apparent that in the lower position of the switch 30, only the main coils 1–6 are connected to the A.-C. source 30, while in the upper position of the switch, both the coil set 1–6 and coil set 1a–6a are connected in series across the line.

For an understanding of the advantages of this invention in comparison with the conventional methods, reference is made to Figs. 3 and 4, which show a typical schematic wiring diagram as used for either a two speed shaded pole winding or a two speed main winding for a permanent split capacitor motor wound for six pole operation. In a typical case, the main winding (coils 1–6 in Fig. 2) is wound with 185 turns per coil of No. 23 AWG wire for each coil and the secondary main winding (coils 1a–6a in Fig. 2) is wound with 65 turns per coil of No. 23 AWG wire for each coil. Fig. 3 shows the voltage distribution in the coils when the motor is run at high speed, i.e., with the 230 volt line across the main windings in series, and Fig. 4 shows the voltage distribution in the coils when the motor is run at low speed, i.e., with both main and secondary main windings all in series across the line.

In practice, the windings are placed in the stator by one of four conventional methods: (1) Machine wound, simultaneous; (2) machine wound, index; (3) mold wound, hand inserted; (4) one winding machine wound, other winding mold wound and hand inserted. In order to produce fractional horsepower motors at a competitive cost, it is desirable to use the simultaneous machine winding where possible, and this leads to the arrangement described above in connection with Figs. 1 and 2.

In the simultaneous winding, the machine is equipped with dual counters and tap pullers. The machine winds 185 turns on all six poles simultaneously, stops, pulls a loop, and then winds an additional 65 turns on all poles.

The loop is then cut, forming two leads, one being the outside lead of the main coil and the other being the inside lead of the secondary main coil. The stator is then connected as shown in Figs. 1–4.

The index winding machine winds one coil at a time and indexes from pole to pole, reversing direction of rotation after each pole to maintain proper polarity. In this case the main winding of 185 turns per coil is normally wound in the stator on one machine and the stator is then transferred to a second machine to index wind the 65 turns per coil secondary main winding directly on top of the main winding. It is apparent that this method is more expensive relative to the cost of the machine, since it takes longer to complete a motor winding.

The mold wound-hand insertion method normally produces a finished winding equivalent to an index machine wound stator. If the coils are all wound with one direction of rotation, every other coil is then inverted during insertion to produce the correct polarity. This method is expensive in terms of labor cost, and is not ordinarily used for fractional horsepower machines.

In all methods of winding, the secondary main winding may be wound first at the option of the manufacturer.

Figs. 3 and 4 show a simultaneous wound motor, for operation on 230 volts input. Fig. 3 shows the voltage distribution on the winding with the motor running on high speed connection. Since all six coils are wound with identical turns and wire sizes, the voltage drop across each coil is 230/6=38.33 volts per coil. The voltage at each inter-coil connection with respect to the common lead reference point of zero voltage is as shown.

The secondary main winding (coils 1a–6a), being wound in direct proximity to the main winding, acts as an open circuited transformer secondary. This winding then has an induced voltage in direct proportion to the turns ratio of the windings. In this case the voltage is $$38.33 \times \frac{65}{185} = 13.47 \text{ volts}$$

This voltage added to the main windings voltage produces a voltage at the inter-coil connections as shown.

It was previously shown that in multiple winding methods, the outside or finish turns of the main windings are in direct contact with the inside or start turns of the secondary main windings. An examination of Fig. 3 shows that these points of contact are at a different potential. The amount of voltage existing between these points is the voltage at the inside turn of the secondary main winding less the voltage at the outside turn of the main winding as shown in the tabulation below:

| Coil No. | 1 | 2 | 3 | 4 | 5 | 6 |
|---|---|---|---|---|---|---|
| Voltage—Start lead secondary main | 230.00 | 256.94 | 256.94 | 283.88 | 283.88 | 310.82 |
| Voltage—Finish lead main | 38.33 | 38.33 | 115.00 | 115.00 | 191.67 | 191.67 |
| Voltage—Between windings | 191.67 | 218.67 | 141.94 | 168.88 | 92.21 | 119.15 |

Fig. 4 shows the same motor connected for slow speed operation. In this case, the entire winding is connected in series across the line and thus there is no transformer action to build up induced voltages. With both windings in series and carrying the same current, the voltage drop across each winding is in direct proportion to the number of turns. This results in a voltage drop of $$230 \times \frac{185}{250} = 170 \text{ volts}$$

across the main winding divided equally between the six coils, or 28.33 per coil. The voltage drop across the secondary main winding is then $$230 \times \frac{65}{250} = 60 \text{ volts}$$

or 10 volts per coil. The voltage distribution throughout the whole winding is shown in Fig. 4, and similarly the voltage between windings is shown in the tabulation below:

| Coil No. | 1 | 2 | 3 | 4 | 5 | 6 |
|---|---|---|---|---|---|---|
| Voltage—Start lead secondary main | 170.00 | 190.00 | 190.00 | 210.00 | 210.00 | 230.00 |
| Voltage—Finish lead main | 18.33 | 28.33 | 85.00 | 85.00 | 141.67 | 141.67 |
| Voltage—Between windings | 141.67 | 161.67 | 105.00 | 125.00 | 68.33 | 88.33 |

It will be noted that the maximum voltage between windings occurs on coil No. 2 in both cases. Also note that the voltage between main and secondary coils is higher on all coils with the motor running on high speed.

A study of Figs. 2 and 4 will also reveal that a motor wound by the index method will produce a winding with the maximum voltage between main and secondary coils on pole No. 1 instead of pole No. 2. Coil No. 1 voltage will be 191.67 volts on high speed and 141.67 volts on low speed as compared to 218.61 volts respectively on coil No. 2 for the simultaneous wind method. This reduction in voltage is due to the fact that the index method winds the coils on the stator with proper polarity whereas the simultaneous method winds all coils the same polarity and they must be connected to give proper polarity.

Historically, multi-speed motors wound by any of the above multi-winding methods have proven to be less reliable and give shorter field life than single speed motors of the same types. Motor burnouts on multi-winding motors almost invariably are caused by insulation failure of the magnet wire at the points of high potential between windings. Examination of field returns on this type motor over the past ten years shows conclusively that on burned out motors, the insulation failure has occurred on either No. 1 or No. 2 coil in the vast majority of cases. These two coils have the highest potential between windings as demonstrated in Figs. 2 and 4.

Until recently, the great majority of multi-speed motors have been wound for 115 volts. From Figs. 2 and 4 it is apparent that the voltage between coils on a 115 volt motor would be just one-half of the voltage shown for 230 volts input. Since these 115 volt motors were used primarily for applications such as circulating fans, exhaust fans, space heaters, etc., where the motor was not continually exposed to the outside elements of rain, snow, etc., reasonably good field life was obtained.

With the increasing popularity of window air conditioners, hundreds of thousands of multi-speed motors are now being used annually to drive the evaporator and condenser fans in these units. When air conditioning first became popular, the great majority of units made were the ⅓ ton, ½ ton, and ¾ ton ratings, most of which were 115 volt units, suitable for plugging into a standard houshold outlet. In recent years, the trend has been toward increasing popularity of the 1 ton, 1½ ton and 2 ton units, because of increased demand for offices, motels, hotels, and even home owners who now air condition the entire house with window units. This demand coupled with the advent of strict regulations by the Utilities and Underwriters Laboratories which limit the current draw to 12 amps, on a single outlet circuit and 7.5 amps. on a multiple outlet circuit for plug-in 115 volt units, has forced the air conditioning manufacturers into high volume production of 230 volts units. As a result, there are more 230 volt units being used today than ever before which, of course, means that the use of 230 volt multi-speed air conditioner fan motors are now being used at the rate of hundreds of thousands per year. At such high volume of production, performance must be coupled with maximum economy to produce a competitive motor.

In a conventional air conditioner, the fan motor usually has a double shaft extension and it drives both the evaporator and condenser fans. The motor is mounted on the condenser side of the unit which projects outside of the window and is exposed to the elements. Under normal operating conditions, the evaporator coil condenses moisture out of the air which runs to the condenser side of the unit. The condenser fan has a "slinger ring" which picks up the water from the bottom pan and slings it against the hot condenser coil which vaporizes it. The action of the condenser fan then blows it to the outside air through the condenser coil. This action results in a condition of continual high humidity and splashing of water directly on the motor. When the air conditioner is not in use, the motor is still subject to direct contact with water from wind driven rain and snow through the air inlet louvres in the air conditioner outer shell.

The continual high humidity condition and direct water condition reduce the insulation resistance considerably. This, coupled with the inherent high voltage between windings, causes an extremely high percentage of motor burn-out failures in service. This problem is one of major concern to the entire air conditioning industry to the point where many manufacturers have been forced into the manufacture of single speed units. This action has resulted in considerable consumer resistance for lack of a low speed for quietness of operation. Single speed motors have been used for years in air conditioners with excellent results for field life. This then proves that a single speed motor, made with normal manufacturing care, will operate successfully under high humidity and water conditions. The difference between success and failure of an air conditioning motor thus is related to the difference between single winding and multiple winding of the stator.

Figure 5:
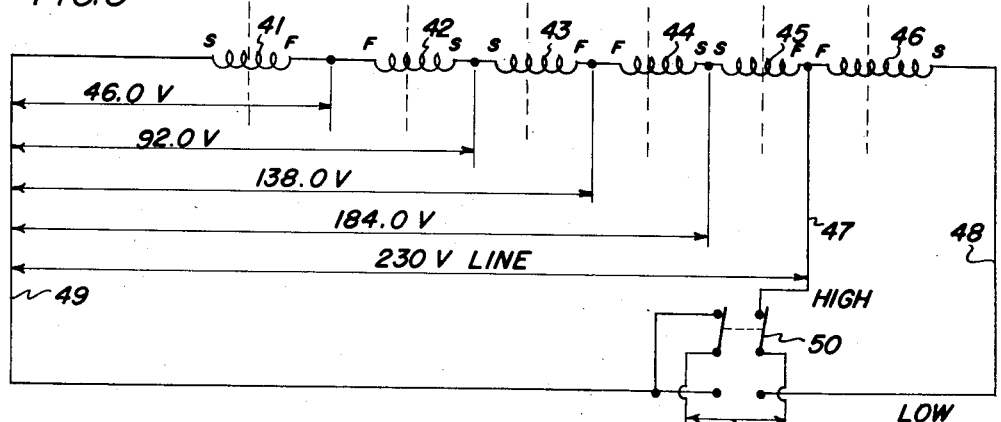
Figs. 5 and 6 are circuit diagrams similar to Figs. 3 and 4, showing the voltage distribution across the coils of a motor wound according to the invention, respectively for high speed and for low speed operation.
Figure 6:
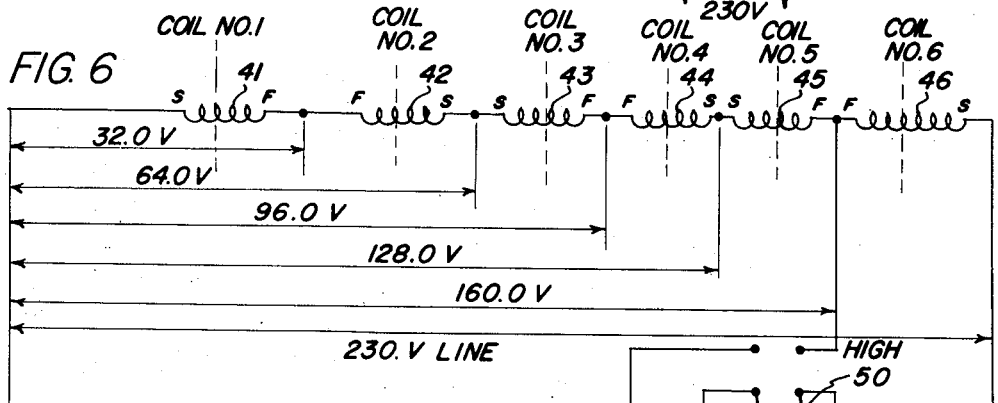

As previously stated, the object of this invention is to provide a motor for multi-speed operation without the use of multiple windings. Figs. 5 and 6 show the schematic wiring of such a motor wound to produce the same high and low speeds in the same application as the conventional two speed motor shown in Figs. 1–4.

In a typical winding as shown in Figs. 5 and 6, coils 41 through 45 are wound with 185 turns per coil of No. 22 AWG wire and coil No. 46 is wound with 300 turns per coil of No. 25 AWG wire. All coils are single windings and are located in separate slots in exactly the same manner as for single speed motors. An external lead 47 is connected at the junction between coils 45 and 46. The number of turns per coil for coils 41 through 45 is designed to give the same full load torque with the motor operating on five energized coils as the motor in Fig. 1 developed when operating on six energized coils for high speed operation. The number of turns and wire size on coil No. 46 is designed so that when it is connected in series with coils 41 through 45, the motor develops the same torque as the motor in Fig. 2 connected on low speed.

In effect, on high speed operation, with switch 50 in the position shown in Fig. 5, the No. 46 pole is a consequent pole and on low speed as shown in Fig. 6, the motor operates as a normal 6 pole motor.

Fig. 6 shows the same arrangement with the 230 volt power source connected across all of the coils in series including coil 46, and also shows the voltage distribution in the coils. It will be apparent that essentially the single speed type of voltage distribution has now been obtained, and that the maximum voltage now present in any coil is 46 volts between the start and the finish leads; as these leads are physically at opposite ends of the coil, the actual maximum voltage between any two adjacent turns is now in the order of a fraction of a volt. Under these conditions, there is practically no tendency for the coil insulation, subjected only to such negligible voltages, to break down.

The windings operation, to be sure, is somewhat less efficient than in the case of Figs. 1–4, since only coils 41–45 can be wound simultaneously, while coil 46 must be separately wound. This last step can be done on a separate winding machine of the same type, or by any of the methods previously described. In compensation, however, is the fact that the motor winding of Fig. 5 requires only half as many manual intercoil connections to be made as that of Fig. 2, since the connections between the secondary main coils 1a–6a are dispensed with, and therefore the connections 21a–25a as well as the two end connections to the secondary main coils 26 and 27 are not required to be made. These connections are made manually by semi-skilled bench operators working on the wound stator sub-assembly, and are therefore very expensive to make in comparison with the cost of winding machine operation. The overall result is a motor which is competitive in cost with those made by conventional methods, but having the high reliability and long life of single speed motors.

It is recognized that a condition of magnetic unbalance exists with this winding method that tends to increase motor noise. However, the severest magnetic unbalance occurs on high speed operation where the air noise from the driven fan is always so much greater in proportion as to make the motor noise inaudible.

It is also recognized that a motor wound with unbalanced winding distribution as in Figs. 5 and 6 will operate at slightly less efficiency than the equivalent balanced winding motor of Figs. 1 and 2. This is somewhat compensated for by the fact that a single winding takes less slot space than a multiple winding and therefore permits the use of larger wire. This is demonstrated by the use of No. 22 wire on the main winding of the Figs. 5 and 6 motor and No. 23 wire on the main winding of the motor of Figs. 1 and 2.

Figure 7:
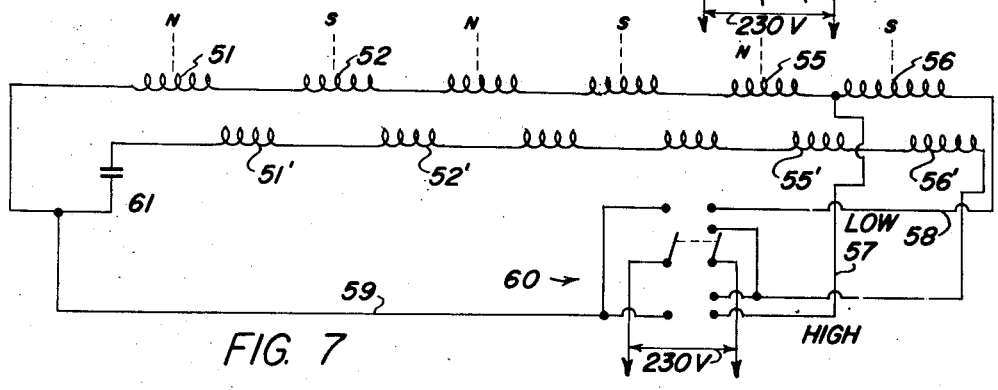
Fig. 7 is a schematic circuit diagram showing the invention applied to a permanent split capacitor motor.

Fig. 7 is a schematic circuit diagram showing the invention applied to a permanent split capacitor motor. The main winding comprises the five similar coils 51–55 instead of the usual six coils (in the assumed case of a 6-pole motor). The sixth pole is wound with the low-speed coil 56, of finer wire and having more turns than the other five coils so that in series with them it will produce the particular lower speed called for by the requirements of the particular 2-speed operation for which the motor is to be used. The auxiliary winding consists of the usual six similar coils 51'–56' wound in the conventional manner 90 degrees spaced between the poles of the main winding poles and in series with usual capacitor 61. The only change required is in the main winding, wherein the secondary main winding required for low speed operation is all wound on one coil placed on the sixth pole, which on high speed operation acts as a consequent pole, but when the secondary main winding is connected into the circuit by operation of switch 60 to the low-speed position, functions as a series low-speed secondary main winding. Thus the usual set of six extra coils for the secondary main winding is eliminated, together with all the extra intercoil connection required for this winding. At the same time the high voltage stress on the insulation, due to the proximity of the secondary main windings to the main winding coils, is eliminated as in the case of the shaded pole motor arrangement previously described.

Although the invention has been described in connection with a 6-pole motor by way of example, it will be apparent that it is equally applicable to other number of poles. According to the invention, a motor can thus be wound to operate at any two predetermined speeds, within a very wide range, in a simple and inexpensive manner, to produce a very reliable motor capable of operating continuously for long periods of conditions of high humidity without insulation breakdown.

It will be apparent that the embodiments shown are only exemplary and that various modifications can be made in construction and arrangement within the scope of my invention as defined in the appended claims.

I claim:

1. A two-speed A.-C. single phase multipolar motor having N main poles of alternate polarity, where N is an even integer; $N-S$ substantially identical main field windings comprising main coils respectively mounted on $N-S$ of said poles, where S is an integer greater than zero and less than $\frac{1}{2}N$, said main coils being wound in the same direction on their respective poles, each coil having a start turn and a finish turn, intercoil series connections between the oppositely related turns of the first and second coils, second and third coils, etc., to the last coil, $N-S$; means for impressing an external line voltage on said series connected main coils for high speed operation of the motor; an additional secondary main winding comprising S coils respectively mounted on the remaining S poles of the motor and connected in series with said main winding; means for alternatively impressing said external line voltage on all of said windings, both main and secondary main, in series to produce a desired low speed operation of said motor, the coils of said secondary main windings having a greater number of turns of smaller size wire than the coils of said main winding.

2. A two-speed single phase A.-C. multipolar motor having N poles, $N-S$ main field windings respectively on $N-S$ of said poles, where N and S are integers and S is considerably smaller than N, said windings being connected in series arrangement with each other to form a main winding, said windings being substantially identical in wire size and number of turns, means for impressing an external line voltage on said main winding for high speed operation of the motor, and an additional coil on each of the remaining poles to form a secondary winding, said last winding having a different number of turns of different size wires from each coil of the main winding, and means for alternatively impressing said external line voltage on all of said windings, both main and secondary main, in series, to produce a desired low speed operation, said secondary main winding being designed to produce, in series with said winding, said desired low speed.

3. The invention according to claim 2, N being an even integer and S being one.

4. The invention according to claim 3, said motor being a shaded-pole motor.

5. The invention according to claim 2, N being six, and S being one.

No references cited.